US007406861B2

(12) United States Patent
Jung et al.

(10) Patent No.: US 7,406,861 B2
(45) Date of Patent: Aug. 5, 2008

(54) METHOD AND DEVICE FOR DETECTING THE IDLE STROKE OF INJECTORS

(75) Inventors: Uwe Jung, Wörth a. d. Donau (DE); Janos Radeczky, Wenzenbach (DE); Michael Wirkowski, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/685,957

(22) Filed: Mar. 14, 2007

(65) Prior Publication Data

US 2007/0204832 A1 Sep. 6, 2007

Related U.S. Application Data

(63) Continuation of application No. PCT/EP2005/053554, filed on Jul. 21, 2005.

(30) Foreign Application Priority Data

Sep. 14, 2004 (DE) ....................... 10 2004 044 450

(51) Int. Cl.
*G01M 15/00* (2006.01)

(52) U.S. Cl. .................................................... 73/119 A

(58) Field of Classification Search ................... 73/112, 73/113, 115, 116, 117.2, 117.3, 118.1, 119 R, 73/119 A See application file for complete search history.

(56) References Cited

U.S. PATENT DOCUMENTS

| | | | | |
|---|---|---|---|---|
| 5,535,621 | A | 7/1996 | Glidewell et al. | 73/119 A |
| 5,633,458 | A * | 5/1997 | Pauli et al. | 73/119 A |
| 6,420,817 | B1 | 7/2002 | Ricci-Ottati et al. | 310/316.01 |
| 7,013,720 | B2 * | 3/2006 | Date | 73/118.1 |
| 7,040,149 | B2 * | 5/2006 | Brock | 73/118.1 |
| 7,188,608 | B2 * | 3/2007 | Wilson et al. | 123/456 |
| 2003/0172720 | A1 * | 9/2003 | Sweetland et al. | 73/49.7 |
| 2003/0213294 | A1 * | 11/2003 | Date | 73/118.1 |
| 2005/0005909 | A1 * | 1/2005 | Oshima | 123/446 |
| 2005/0087004 | A1 * | 4/2005 | Brock | 73/119 A |
| 2005/0235964 | A1 * | 10/2005 | Shibata | 123/458 |
| 2006/0101904 | A1 * | 5/2006 | Brock | 73/120 |

FOREIGN PATENT DOCUMENTS

| | | | |
|---|---|---|---|
| DE | 199 02 807 | C1 | 6/2000 |
| DE | 199 05 340 | A1 | 8/2000 |
| EP | 0 905 359 | A2 | 3/1999 |
| EP | 1 236 880 | A1 | 9/2002 |
| GB | 2 104 157 | A | 3/1983 |

OTHER PUBLICATIONS

International Search Report and Written Opinion for International Application No. PCT/EP2005/053554 (11 pages), Oct. 28, 2005.

* cited by examiner

*Primary Examiner*—Eric S McCall
(74) *Attorney, Agent, or Firm*—Baker Botts L.L.P.

(57) ABSTRACT

In a method and device for characterising the return stroke of injectors, in particular piezo-injectors of an internal combustion engine provided with a common rail system, when the internal combustion engine is switched off, a constant pressure is dropped in the rail, thereby making it possible to measure the rail pressure and to adjust the injectors by corresponding power. The actuating power is increased until a discontinuity in a temporal progression of rail pressure occurs. The actuating energy applied for the state and a pressure available in the make it possible to measure the return stroke of corresponding injector.

14 Claims, 1 Drawing Sheet

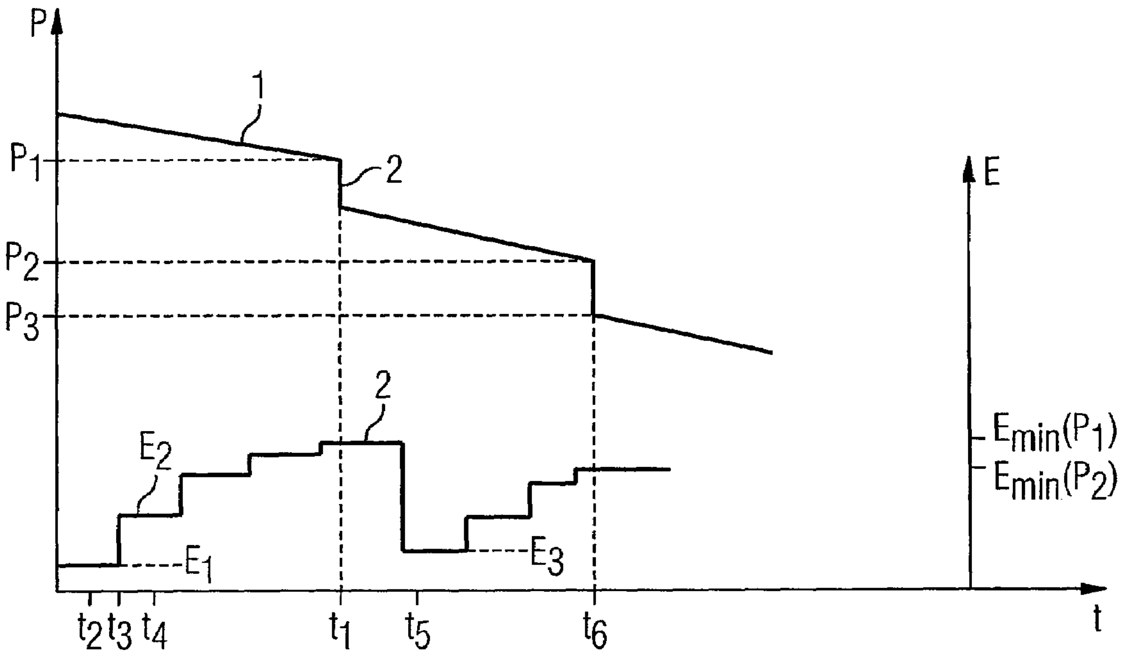
P
1
P1
2
P2
P3
E
2
Emin(P1)
Emin(P2)
E2
E1
E3
t2 t3 t4
t1
t5
t6
t

METHOD AND DEVICE FOR DETECTING THE IDLE STROKE OF INJECTORS

CROSS-REFERENCE TO RELATED APPLICATIONS

This application is a continuation of International Application No. PCT/EP2005/053554 filed Jul. 21, 2005, which designates the United States, and claims priority to German application number DE 10 2004 044 450.1 filed Sep. 14, 2004.

TECHNICAL FIELD

The invention relates to a method for detecting the idle stroke of injectors and to a device for detecting the idle stroke of injectors.

BACKGROUND

Methods of this kind are crucially important in order to ensure the accuracy of fuel metering in the case of small injection volumes. If the small injection volumes are not accurate, the strict exhaust emission standards for diesel passenger vehicle engines cannot be complied with. There are two basic developments in order to minimize the injector's tendency toward injector dispersion. This can be effected on the one hand by means of a highly precise and very expensive injector manufacturing process. In said process all the injectors are measured on the production line and the injectors lying outside the narrow tolerance are separated out and rejected. On the other hand methods are known which compensate for the injector's tendency toward injector dispersion while the engine is in operation. For example, it can be ascertained by way of a knock sensor of the internal combustion engine which control parameters are necessary in order to activate the individual injector so that fuel will currently be injected (switching leakage). It is disadvantageous in this case that the activation condition of the method is dependent on the driving behavior of the driver. In order to establish the idle stroke by means of a method of said kind it is necessary that the operating condition of the internal combustion engine remains unchanged for a certain period of time. If this corresponding period of time is interrupted due to the driver's driving behavior, the process of determining the idle stroke cannot be completed in full.

SUMMARY

A method and a device for detecting the idle stroke of injectors can be designed to operate independent of the driving behavior of the driver. According to an embodiment, a method for detecting the idle stroke of injectors, in particular piezo injectors, of an internal combustion engine having a common rail system may comprise the steps of a) setting a constant rail pressure, a continuous rail pressure drop or buildup, b) measuring the current rail pressure, c) activating at least one injector actuator by means of an amount of actuator energy, d) changing the actuator energy, and e) repeating the steps b) through d) until a discontinuity occurs in the course of the rail pressure over time.

According to another embodiment, a device for detecting the idle stroke of injectors of an internal combustion engine having a common rail system, may comprise a fuel pressure accumulator, an injector connected to the fuel pressure accumulator, a rail pressure sensor, and a control unit for actuators of the injectors, wherein the control unit is operable to change an actuator energy until the rail pressure sensor detects a discontinuity in the course of the rail pressure over time, and wherein the device has a memory unit for storing the actuator energy value present during the discontinuity and the rail pressure value present.

BRIEF DESCRIPTION OF THE DRAWINGS

The invention is explained below by way of example with reference to the schematic drawing, in which:

FIG. 1 shows a time curve of a rail pressure and a time curve of an amount of actuator energy.

DETAILED DESCRIPTION

According to an embodiment, in a method and a device for detecting the idle stroke of injectors, a constant pressure or a continuous drop or increase in pressure is set. The current rail pressure is measured. An actuator of the injector is activated by means of an amount of actuator energy. The set actuator energy is then changed. This process is then repeated until a discontinuity has occurred in the course of the rail pressure over time. The actuator energy is preferably increased continuously or step by step. The change in the actuator energy is limited by the possibility of the power stage. A stepwise change is to be preferred for reasons of cost. Preferably the decrease in rail pressure can be set at the time the internal combustion engine is being switched off. After the internal combustion engine has been switched off, no more fuel is delivered to the fuel accumulator. The pressure present in the fuel accumulator drops automatically due to leakages. Possibly an additional leakage due to one of the injectors is desired.

A further embodiment is to set a continuous buildup of pressure when the internal combustion engine is started. When the internal combustion engine is started, the feed pump delivers fuel into the fuel accumulator (rail) and in this way slowly and continuously builds up the pressure therein. This can also be used to determine the value pairs pressure and associated injector energy (actuator energy). Value pairs of this kind are preferably stored in a memory, for example.

A further embodiment is to set the actuator energy to an initial value after a discontinuity in the course of the rail pressure over time has been determined, with the current rail pressure then being measured, the actuator of the injector being activated by means of an amount of actuator energy and the actuator energy being varied until a discontinuity once again occurs in the course of the rail pressure over time. With highly leakproof common rail systems in which the drop in pressure is inherently very small, it is possible to record the energy of the switching leakages at different rail pressures in a single operation of switching off the internal combustion engine. The energy for the switching leakage is dependent on the rail pressure. At high rail pressures a higher energy is necessary than at low rail pressures. Thus, fewer switching-off operations are necessary in order to update the value pairs actuator energy and rail pressures.

Further advantageous embodiments of the invention are set forth in the dependent claims.

The method according to different embodiments will be explained in more detail with reference to the action of switching off the internal combustion engine.

In the upper section of the diagram FIG. 1 shows the time curve with rail pressure designated by 1. The time curve with actuator energy designated by 2 is shown in the lower part of the diagram.

In a common rail system there is provided a fuel accumulator to which an injector, in particular a piezo injector, is connected. The actuator of the injector, in this case a piezo actuator, receives an activation signal with the energy shown in FIG. 1.

When an internal combustion engine having a common rail system is switched off, the pressure in the common rail system drops linearly and continuously until time $t_1$. The drop in pressure in the fuel accumulator of the common rail system is conditional on leakage flows. According to an embodiment, an activation signal with energy $E_1$ is applied to the piezo actuator of the injector at time $t_2$. The energy $E_1$ is too small to press the servo valve of the injector out of its seating. At time $t_3$ the actuator energy is increased to $E_2$. With a short delay at time $t_4$ the activation signal is applied to the piezo actuator. As can be seen in pressure curve 1 shown at the top, this energy $E_2$ is also too small. This operation is repeated until the actuator energy has reached the minimum energy $E_{min}(p_1)$. An activation signal is applied to the piezo actuator with this energy $E_{min}(p_1)$ at time $t_1$. This time the energy is sufficient to press the servo valve out of its seating, as a result of which the rail pressure drops abruptly.

This can be seen in FIG. 1 as edge 2. Said edge 2 or, as the case may be, discontinuity in the course of the rail pressure over time can be used to assign the minimum actuator energy to the corresponding rail pressure $p_1$. If there is still sufficient pressure present in the rail, the method according to an embodiment can be repeated once more. In this case the actuator energy is set to the initial value $E_3$. An activation signal with the energy $E_3$ is applied to the piezo actuator at time $t_5$. Since the energy $E_3$ is too small to press the servo valve out of its seating, the energy is increased again and accordingly an activation signal is emitted to the actuator. This is repeated until sufficient energy is present to press the servo valve out of its seating. This time this happens at an energy $E_{min(2)}$. By means of this energy an activation signal is applied to the piezo actuator at time $t_6$. This once again produces an extreme drop in pressure in the rail. The rail pressure drops from $p_2$ to $p_3$ A further value pair (energy, pressure) has thus been determined. All the value pairs are updated over time.

As an alternative thereto it is conceivable to perform this method according to an embodiment during a coasting phase of an internal combustion engine. This opens up the possibility of bringing the rail pressure to a desired adjustment value, for example by opening a volumetric flow control valve (VCV). Since the internal combustion engine continues to run in coasting mode, the feed pump can consequently deliver more fuel to the rail in order to increase the pressure there accordingly to the desired adjustment value. Once the adjustment of one injector has been completed—following the occurrence of a discontinuous drop in pressure—the next injector can be adjusted, the same starting pressure being set as at the first injector. This process is repeated until all the injectors of the internal combustion engine have been adjusted. In this way all the injectors can be adjusted selectively for specific pressure values.

By means of this method according to an embodiment it is ensured that an idle stroke correction of the injectors is performed independently of a driver's driving profile, since the method according to an embodiment can be performed each time the engine is switched off. The method according to an embodiment enables a precise energy pre-control to be learned, even in the case of known systems for correcting idle stroke differences between the individual injectors by energy adjustment. Systems of this kind require a minimum activation time and a specific activation condition to be reached for the purpose of executing the known system.

Known systems that evaluate the combustion signal, such as a knock sensor or speed sensor, can complement the method or device according to an embodiment and can separately acquire the relation between idle stroke and injector seating wear in respect of volume correction of the individual injectors. By the combination of the method according to an embodiment and known systems greater volumes of data are captured, thus permitting a more accurate calculation of the activation time correction.

In essence the method according to an embodiment enables the very narrow injector manufacturing tolerances to be expanded and reduces the reject percentage of manufactured injectors. Furthermore piezo actuators do not need to be preconditioned, since the method according to an embodiment compensates directly for the idle stroke by energy adjustment throughout the injector service life. In comparison with the other known methods the method or device according to an embodiment is also characterized by its robustness and in that the method according to an embodiment can be realized without additional components.

The invention claimed is:

1. A method for detecting the idle stroke of injectors, in particular piezo injectors, of an internal combustion engine having a common rail system comprises the following steps:

a) setting a constant rail pressure, a continuous rail pressure drop or buildup, b) measuring the current rail pressure, c) activating at least one injector actuator by means of an amount of actuator energy, d) changing the actuator energy, e) repeating the steps b) through d) until a discontinuity occurs in the course of the rail pressure over time, wherein after step e) the set actuator energy and the current rail pressure are stored as a measure for the idle stroke of the injector.

2. The method according to claim 1, wherein the actuator energy is changed discretely to another actuator energy level, the actuator of the injector being activated by means of at least one activation signal per set actuator energy level.

3. The method according to claim 1, wherein the applied actuator energy is constant over time and is increased or reduced when it changes by a specific amount of energy.

4. The method according to claim 1, wherein the applied actuator energy is increased continuously or decreased continuously.

5. The method according to claim 1, wherein a continuous drop in rail pressure is set in step a) when the internal combustion engine is switched off.

6. The method according to claim 1, wherein a continuous buildup in rail pressure is set in step a) when the internal combustion engine is started.

7. The method according to claim 1, wherein after the energy and rail pressure values are saved steps b) through e) are performed, the actuator energy being set to an initial value beforehand.

8. The method according to claim 1, wherein during a coasting phase of the internal combustion engine a constant rail pressure or a continuous drop in rail pressure is set in step a).

9. The method according to claim 8, wherein after step e) the pressure in the rail is increased to a desired adjustment value.

10. A device for detecting the idle stroke of injectors of an internal combustion engine having a common rail system, comprising a fuel pressure accumulator, an injector connected to the fuel pressure accumulator, a rail pressure sensor, and a control unit for actuators of the injectors, wherein the control unit is operable to change an actuator energy until the rail pressure sensor detects a discontinuity in the course of the rail pressure over time, and wherein the device has a memory unit and the control unit is further operable after detecting the discontinuity to store the set actuator energy and the current rail pressure as a measure for the idle stroke of the injector.

11. The device according to claim 10, wherein the control unit changes the actuator energy discretely to another actuator energy level, and wherein the actuator of the injector is activated by means of at least one activation signal per set actuator energy level.

12. The device according to claim 10, wherein the control unit keeps the applied actuator energy constant over time and increases or reduces the actuator energy by a specific amount of energy.

13. The device according to claim 10, wherein the control unit increases or decreases the applied actuator energy continuously.

14. A device for detecting the idle stroke of injectors, in particular piezo injectors, of an internal combustion engine having a common rail system, comprising:

means for setting a constant rail pressure, a continuous rail pressure drop, or buildup, means for measuring the current rail pressure, means for activating at least one injector actuator by an amount of actuator energy, means for changing the actuator energy, wherein the means for setting, measuring, activating, and changing are operable until a discontinuity occurs in the course of the rail pressure over time, and means for storing the set actuator energy and the current rail pressure after detection of the discontinuity as a measure or the idle stroke of the injector.

* * * * *